Feb. 18, 1969　　　F. M. BODINGTON, JR　　　3,427,903
SAW SHARPENING MACHINE

Filed May 3, 1966　　　　　　　　　　　　　　Sheet 1 of 5

INVENTOR.
FREDERICK M. BODINGTON, JR.
BY
Barlow & Barlow
ATTORNEYS

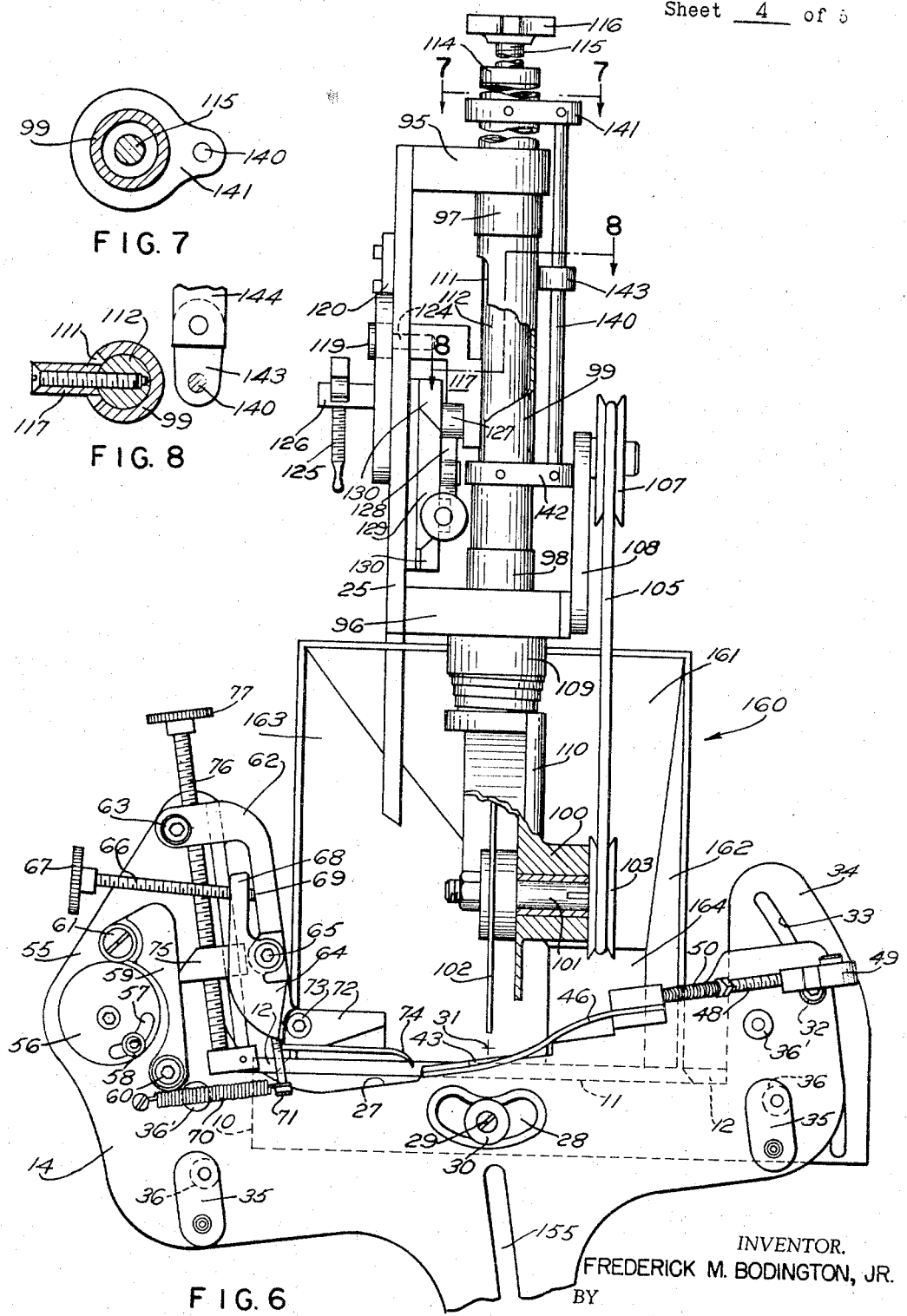

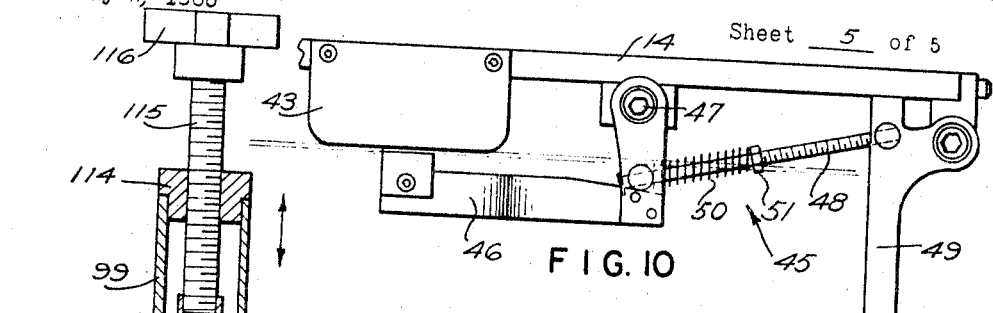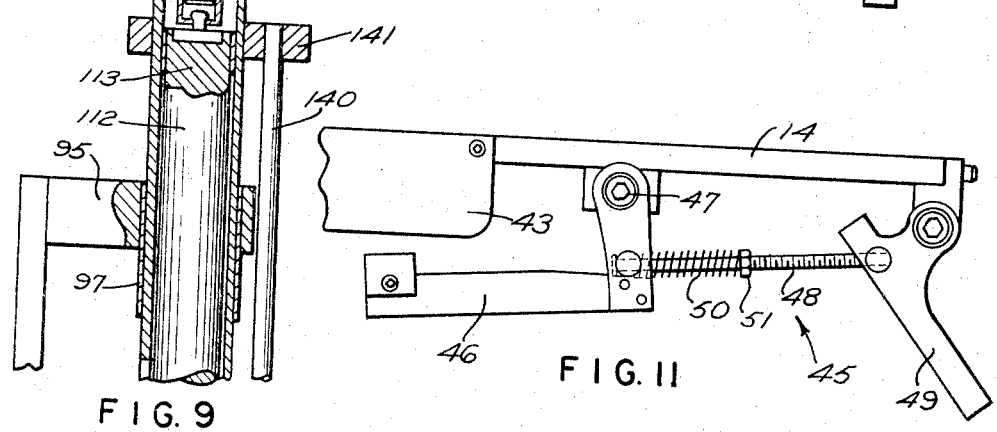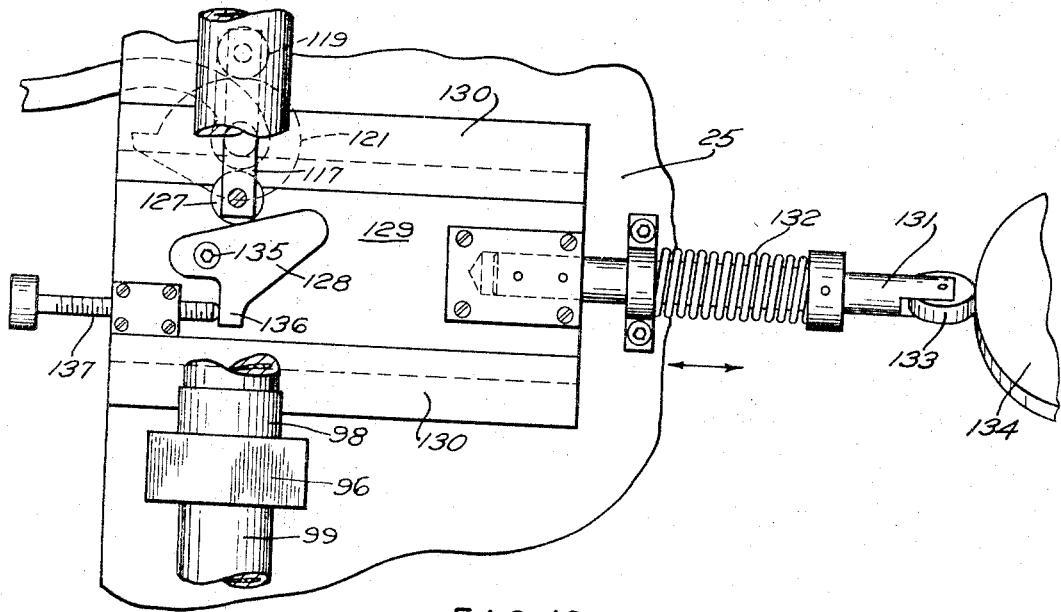

United States Patent Office 3,427,903
Patented Feb. 18, 1969

3,427,903
SAW SHARPENING MACHINE
Frederick M. Bodington, Jr., South of Commons,
Little Compton, R.I. 02837
Filed May 3, 1966, Ser. No. 547,236
U.S. Cl. 76—37
Int. Cl. B23d 63/12
15 Claims

ABSTRACT OF THE DISCLOSURE

The machine comprises essentially a bed which may be fastened securely to some horizontal table or support and presents a generally horizontal surface. The bed mounts a swinging plate or tilting plate at right angles to its horizontal surface and in substantially a vertical plane upon which a carriage for holding the saw is mounted. This tilting plate also carries a feeding means for moving the saw step by step in accordance with its teeth for advancing it to a position so that each tooth may be individually sharpened. Upon the bed there is mounted a base with an upstanding support which base and support may be moved with reference to the bed for centering purposes generally toward and from the tilting plate upon which the saw is fed. This upstanding support mounts a grinding wheel which reciprocates vertically as the saw is advanced to grind the teeth of the saw. A motor, which may be separate or may be conveniently carried by the base, serves to drive the grinding wheel and also serves to drive the mechanism carried by the support for lifting and lowering the grinding wheel and also for turning the grinding wheel at different angles to the plane of the saw to accommodate the bevel of the teeth. The motor, also, through an extendable and universal joint shaft drives the feeding means for the saw.

---

One of the objects of this invention is to provide a saw sharpening machine with the saw so mounted that it may be adjusted to accommodate the angle of the teeth of the saw being sharpened.

Another object of this invention is to provide a saw sharpening machine in which the saw may be adjusted to compensate for the angle of the teeth and in so doing pivot the saw or move the saw about a point which passes through the teeth of the saw or a line of the teeth of the saw.

Another object of the invention is to provide a drive for the feeding means from the same motor that drives the saw and at the same time permit the feeding means to be adjusted to various positions.

Another object of the invention is to provide simple adjustments for varying the throw of the grinding wheel.

Another object of the invention is to provide a means by which the feed of the saw may be easily and quickly adjusted.

A further object of the invention is to provide a simple mounting for reciprocating the grinding wheel and also oscillating it about the axis of its reciprocating movement.

A still further object of the invention is to provide a removal of dust or material which is removed from the saw or the grinding wheel.

With these and other objects in view, the invention consists of certain novel features of construction as will be more fully described and particularly pointed out in the appended claims.

In the accompanying drawings:

FIG. 6 is an elevation with parts shown in section on a larger scale than shown at FIG. 1 with the saw carriage omitted and illustrating particularly the tilting plate upon which the saw carriage is mounted;

FIG. 7 is a section on lines 7—7 of FIG. 6.

FIG. 8 is a section on line 8—8 of FIG. 6;

FIG. 9 is a sectional view of the plunger and sleeve for vertical movement of the grinding wheel;

FIG. 10 is a top plan view of the clamping means for the saw on the tilting plate in one position;

FIG. 11 is a view similar to FIG. 10 but showing the clamping means in release position; and FIG. 12 is a fragmental elevation of parts shown in FIG. 5 on a larger scale and with parts broken away to show the reciprocating mechanism for oscillating the saw.

Figure 3:
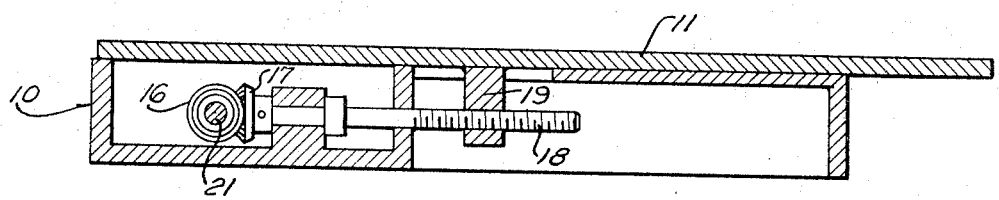
FIG. 3 is a fragmental sectional view through the body and base of the machine.
Figure 4:
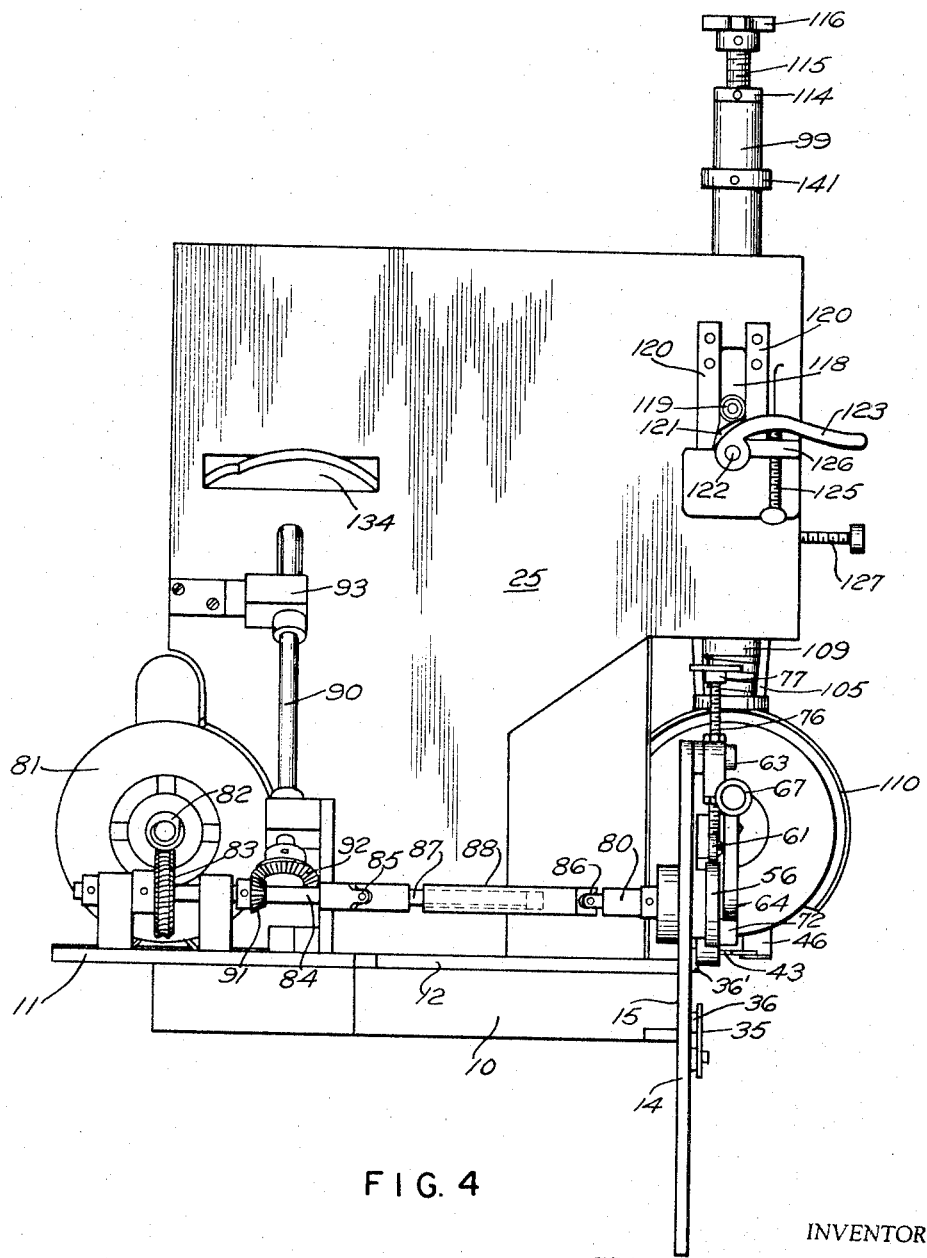
FIG. 4 is a side elevation of one side of the machine.
Figure 5:
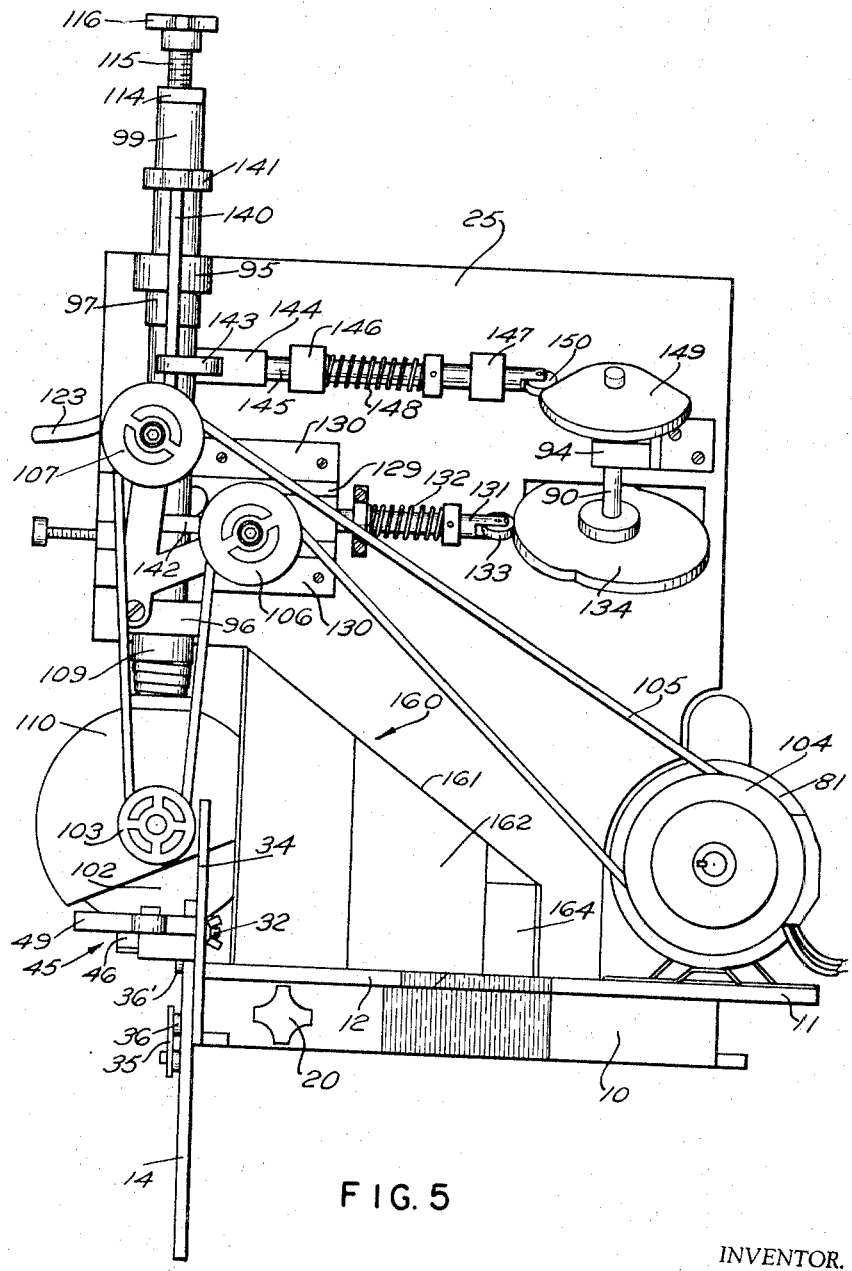
FIG. 5 is a side elevation of the other side of the machine.

With reference to the drawings, 10 (FIGS. 3, 4, 5) designates the bed of the machine which may be suitably mounted upon some horizontal table or support. Upon this bed 10 there is slidably mounted a base 11 by means of gibs 12 (FIG. 6) on either side which permit the movement of the base on the bed in a straight line movement toward and from the tilting plate 14 at the front edge 15 (FIG. 4) of the bed. Suitable bevel gears 16 and 17 (FIG. 3) and a threaded shaft 18 passing through a nut or downwardly threaded projection 19 on the base serve to move the base 11 on the bed 10 in rsponse to the rotation by the hand wheel 20 (FIG. 5) at the end of shaft 21 rotatably mounted in the bed. This movement serves to center the grinding wheel with reference to the saw as will presently appear. An upright support 25 extends upwardly from the base 11 and serves as a main mounting for the operating parts of the machine.

The tilting plate 14 is in generally a vertical plane and in face to face engagement with the front edge 15 of the base of the bed. Below the upper edge 27 (FIG. 6) of this plate, there is an arcuate slot 28 which receives a stud and washer 29 and 30 permitting the plate to rock in this arc of this slot about a pivot point 31 which is above the edge of the plate 27 and is at a location substantially through the line of the saw teeth which are to be operated upon. To pivot about the saw teeth is highly desirable. A stud 32 extends rearwardly from this plate and passes into an arcuate slot 33 in the bracket 34 (FIGS. 5, 6) which is fixed to the bed 10. The arc or slot 33 is also struck from the center 31 so as to provide a second guide for the swinging of the plate about this center. Plate 14 also carries guides 35 spaced from the plate with rollers 36 between the guides 35 and the plate for engaging the lower edge of bar 37 (FIGS. 1, 2) of the saw carriage designated generally 38 and shown in FIG. 2 for sliding the same on these rolls. The upper edge of the bar 37 is being guided by rolls 36'.

Figure 1:
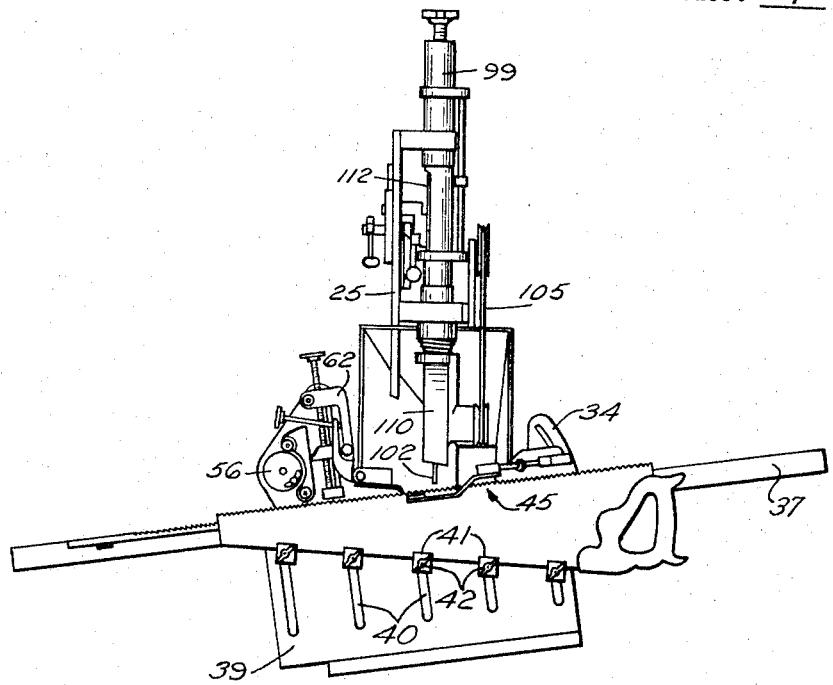
FIG. 1 is a front elevation of the machine with a saw mounted therein for operation of the machine.
Figure 2:
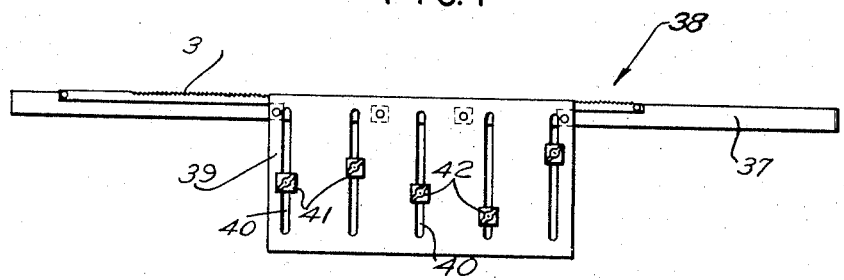
FIG. 2 is a detail elevation of the saw carriage with the saw omitted.

The saw carriage bar 37 is notched as at 38' to provide a feeding rack and is also equipped with a binding plate 39 having slots 40 therein, each equipped with a stud and washer 41 and a wing nut 42 for engaging the saw as shown in FIG. 1 and securing it firmly to the plate 39. The equipped carriage with the saw clamped in position may be slid endwise so that the bar 37 slides between rolls 36, 36' and is located between the guides 35 and the tilting plate 14. A lip 43 (FIGS. 6, 10) projects forwardly from the upper edge of the plate 14 and serves as a spacer for locating the saw spaced from the plate 14. Clamping means designated generally 45 are mounted on the plate 14 comprising an arm 46 having an elbow pivoted as at 47 and swung by means of link 48 pivoted to lever 49 and having a spring 50 to press the saw against the lip 43 and hold it in position. The tension of spring 50 may be adjusted by nut 51 on threaded link 48.

The plate 14 at the left-hand end as shown in FIG. 6 extends upwardly to provide a bracket portion 55 for mounting the saw feed mechanism. The feed mechanism for the saw is operated by means of a cam 56 rotatably mounted on the plate 14 and adjustable by means of slot 57 and securing stud 58 which may be removed for replacing the cam by a cam of different characteristics. A lever 59 is pivoted as at 60 and has a cam follower 61 which engages the cam 56 and is swung about its pivot as the cam rotates. Lever 59 transfers its motion to a lever 62 which is pivoted as at 63 and which has a lower portion 64 pivoted as at 65 and adjustable with relation to arm 62 through means of the screw 66 and handle 67, the screw passing through the end 68 of the adjustable portion of the lever and bearing against the lever 62 as at 69 and held in such position by spring 70 engaging arm 71 fixed to portion 64. This adjustment serves to position the saw tooth. This lower portion of the lever has pivoted thereto a pawl carrying member 72 pivoted as at 73 and carrying pawls 74 one of which is adapted to engage the teeth of the saw or the rack 38 of the carriage on which the saw is mounted depending upon the placement of the pawls 74. The several pawls of slightly different length take care of variation of spacing of the teeth. This lever 62 also carries an adjustable beveled abutment 75 mounted on the threaded rod 76 having handle 77 enabling it to engage the lever 59 at various locations to adjust the throw of the lever 62.

The cam 56 which is spaced from the plate 14 is driven by means of shaft 80 having collars on either side of the plate from an electric motor 81 having a worm 82 on its shaft engaging the worm gear 83 on shaft 84, which shaft 84 is connected to shaft 80 by two universal joints 85 and 86 with telescoping portions 87 and 88 keyed to each other extending between the two universal joints. By this arrangement the plate 14 upon which the feeding mechanism is mounted is enabled to be moved about the center 31, while the shaft with the universal joints and telescoping extension may accommodate the movement of the plate. It also permits centering of the grinding wheel which is carried by the support 25 and which support also mounts the motor 81 on the base 11 to be moved toward and from the plate 14 upon which the saw carriage is mounted.

Cam shaft 90 is also driven from the shaft 84 by means of bevel gears 91 and 92 and extends at an angle to the support 25 being mounted in bearings 93 (FIG. 4) on one side of the support and 94 (FIG. 5) on the other side of the support.

Blocks 95 and 96 extend from one side of the upright support 25 and are bored to receive bearings 97 and 98 which slidably and rotatably support a cylindrical sleeve 99 at the lower end of which there is a boss 100 which rotatably mounts a shaft 101 upon which the grinding wheel 102 is mounted. A pulley 103 fixed on the end of shaft 101 is driven from a pulley 104 (FIG. 5) on the opposite end of the armature shaft of the motor 81 by means of an elastic or rubberlike belt 105 which is directed over idler pulleys 106 and 107 supported on a bracket 108 from the block 96. A helical springlike dust shield 109 may close the space between the guard 110 and the block 96. The sleeve 99 is cut away as at 111 for a portion of its length and a portion of its circumference to provide access to a piston 112 which is reciprocally mounted in this sleeve 99. The piston 112 is of cylindrical shape and slidably closely fits the sleeve and is guided thereby. It is of a solid construction or may be tubular. Its upper end 113 (FIG. 9) provides a support for the cylindrical sleeve by means of a cap 114 on the sleeve with a threaded stud 115 extending through the cap 114 and permitting of adjustment of the sleeve relative to the piston by means of the hand wheel 116. The piston 112 has securely fixed thereto an arm 117 (FIG. 6) which extends out through the cutaway portion 111 of the sleeve. This arm 117 extends through a slot 118 (FIG. 4) in the upright support 25 and is equipped with a roller 119 which is guided between plates 120 on the far side of the support 25 as the piston 112 reciprocates. A cam 121 pivoted as at 122 on plate 25 may be swung by lever 123 to engage the shaft 124 mounting roller 119 so as to raise the piston away from its reciprocating mechanism. This cam may also serve to limit the amount that the piston may descend by reason of the screw 125 (FIG. 4) threaded through block 126 on plate 25 which will engage the underside of the lever 123.

The arm 117 also carries a cam follower 127 (FIG. 12) which engages a cam 128 carried by the slide 129 mounted in gibs 130 on the surface of the upstanding support 25. This slide 129 has a rod 131 extending therefrom which is forced rearwardly as by spring 132 and which carries a cam follower 133 to engage double cam 134 keyed on the cam shaft 90. Thus, as this cam rotates, the slide 129 will be moved to slide the cam 128 carried thereby and which has a tapered surface so as to cause the piston to rise and, as it is retracted, the piston to lower in order to provide a reciprocating motion of the piston and the cylindrical sleeve which is carried thereby. Cam 128 is pivotally mounted on the slide as at 135 and is provided with an arm 136 against which screw 137 bears to adjust the cam about its pivot so as to provide a steeper or less steep surface for the roller 127 to follow and thus adjust the throw of the piston.

In order to rock the cylindrical sleeve 99 about its longitudinal axis, I have mounted a rod 140 parallel to the longitudinal axis but at a point spaced from the outer surface of the cylindrical sleeve, this being accomplished by brackets 141 and 142 fixed to sleeve 99. This rod is then engaged at some point along its length by a collar 143 (FIG. 5) which is rockably connected to a block 144 at the end of rod 145 which is slidably mounted in blocks 146 and 147 and urged in one direction by spring 148 while it is moved in the other direction by a cam 149 on cam shaft 90 and cam follower 150 on the end of rod 145. This cam is interchangeable with other cams and provides the necessary rocking motion for the grinding wheel enabling it to descend and grind the face of one tooth while, as it ascends, it has rocked and will grind the face of the next tooth of alternate bevel saws.

The pawls 74 may be positioned in a location to engage either the teeth of the saw or the index bar 38' alongside the saw. Most accurate grinding will occur if the index bar is engaged. In the case of a circular saw, the circular saw will be mounted in the slot 155 in the tilting plate 14.

A generally funnel-shape casing designated 160 (FIGS. 5 and 6) includes a downwardly inclined back wall 161 and inclined and converging side walls 162 and 163 joining the base with an open back at 164 to which some suction means may be attached for withdrawing any dust or particles which may be formed by the grinding operation of the saw 102.

In use a saw is mounted upon saw carriage 38 as shown in FIG. 1 and the following adjustments are made in the machine with reference to the particular saw which is to be worked upon. The knob 116 (FIGS. 4, 5, 6 and 9) is adjusted to increase or decrease the degree of grinding of the grinding wheel 102. The lever 123 (FIG. 4) is used for raising or lowering the grinding wheel and its assembly. Screw 125 controls the gullet depth of the saw and knob 127 is used to increase or decrease the angle of the back of the tooth. Knob 77 (FIG. 6) is used to increase or decrease the length of the feed of the pawl 74 which move the saw tooth by tooth. Knob 67 positions the saw in relationship to the grinding wheel. Knob 20 (FIG. 5) moves the machine so as to center the wheel in relationship to the saw and knob 32 allows the plate to be moved to achieve the desired angle of the saw. Cam 149 may be replaced or selected so as to achieve varying angles of the grinding wheel. The clamping of the saw in position is of course clear from FIGS. 10 and 11.

I claim:
1. A saw sharpening machine comprising a support, a grinding means carried by said support, a plate, a saw carriage slidably mounted on said plate for moving the saw, means to rockably mount said plate with reference to said support about a pivotal point substantially in the line of the teeth of a saw carried by said carriage, said means to mount said plate comprising two arcuate slots in said plate and studs on said support extending through said slots.

2. A saw sharpening machine as in claim 1 wherein said slots are disposed to guide and said plate about a point as a center outside of and beyond the area of said plate.

3. A saw sharpening machine comprising a support, a grinding means carried by said support, a plate, a saw carriage slidably mounted on said plate for moving the saw, means to rockably mount said plate with reference to said support, feeding means for the saw carried by said plate, a motor on said support and a shaft having telescoping parts connected at one end to said feeding means carried by said rockable plate and means to move the grinding means to contact a saw carried by said saw carriage.

4. A saw sharpening machine as in claim 3 wherein said feeding means comprises a cam driven by said shaft and levers actuated by said cam.

5. A saw sharpening machine comprising a support, a grinding means carried by said support, means for mounting a saw for movement with reference to said grinding means, means for feeding said saw in one direction with reference to said grinding means, said feeding means comprises a cam and a pair of levers actuated by said cam with means connecting said levers to adjust the feed which is actuated by said cam.

6. A saw sharpening machine comprising a support, a cylindrical sleeve rockably and slidably mounted thereon, a piston axially slidable in said sleeve, means for axially reciprocating said piston in said sleeve, said sleeve carrying at one end a grinding wheel, means external of said sleeve for rocking said sleeve about its axis and an abutment carried by said sleeve and engaging said piston to move said sleeve with said piston as the piston is reciprocated.

7. A saw sharpening machine as in claim 6 wherein said abutment is adjustable to vary the position of the grinding wheel.

8. A saw sharpening machine as in claim 6 wherein said means for reciprocating said piston is adjustable to vary the throw of the piston.

9. A saw sharpening machine as in claim 6 wherein said means for reciprocating said piston comprises a cam surface and means to adjust the same.

10. A saw sharpening machine as in claim 6 wherein the sleeve is provided with a slot and said reciprocating means has a portion extending radially outwardly through said slot.

11. A saw sharpening machine as in claim 6 wherein said reciprocating means comprises a slide movable along said support.

12. A saw sharpening machine comprising a bed, means for mounting a saw for adjustable movement relative to said bed, a support, means for mounting a grinding wheel on said support for movement with reference to said support and means for moving said support with reference to said bed and toward and from the plane of the saw.

13. A saw sharpening machine as in claim 12 wherein said moving means comprises angularly related shafts, one of which is threaded, and beveled gears for transmitting motion from one shaft to the other.

14. A saw sharpening machine comprising a support, a plate, a saw carriage slidably mounted on said plate for moving the saw, means to slidably clamp the saw to said plate comprising a jaw pivotally mounted on said plate, a lever pivoted on said plate, and a link pivotally connected to said lever and to said jaw having a spring for urging said jaw to closed position in one position of said lever.

15. A saw sharpening machine comprising a support, a grinding means carried by said support, means for mounting a saw for movement with reference to said grinding means, means for feeding said saw with reference to said grinding means, said feeding means comprising a cam driven and a pair of levers actuated by said cam, one of said levers mounting a block which engages the other lever and means for adjusting said block along the lever on which it is mounted to adjust the feed of the saw.

References Cited

UNITED STATES PATENTS

| | | | |
|---|---|---|---|
| 365,337 | 6/1887 | Gould | 76—41 |
| 1,480,172 | 1/1924 | Majewicz | 76—41 |
| 2,155,809 | 4/1939 | Thurston | 76—41 |
| 2,483,336 | 9/1949 | Deyarmond | 76—42 |
| 3,008,357 | 11/1961 | Burns | 76—41 |

GRANVILLE Y. CUSTER, Jr., *Primary Examiner.*

U.S. Cl. X.R.

76—41, 42